US011251951B2

(12) United States Patent
Isenhour et al.

(10) Patent No.: US 11,251,951 B2
(45) Date of Patent: Feb. 15, 2022

(54) REMOTE AUTHENTICATION FOR ACCESSING ON-PREMISES NETWORK DEVICES

(71) Applicant: MICROSOFT TECHNOLOGY LICENSING, LLC, Redmond, WA (US)

(72) Inventors: Joseph B. Isenhour, Redmond, WA (US); Sergeii Gubenko, Sammamish, WA (US); Paul J. Miller, Rockwall, TX (US); Andrew James Wiley, Bellevue, WA (US); Mitchell O. Lindgren, Redmond, WA (US); Haitao Wang, Redmond, WA (US); Sagar Bholanath Saha, Renton, WA (US); Steven James Syfuhs, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 88 days.

(21) Appl. No.: 16/775,244

(22) Filed: Jan. 28, 2020

(65) Prior Publication Data

US 2021/0234677 A1    Jul. 29, 2021

(51) Int. Cl.
*H04L 9/08* (2006.01)
*H04L 9/32* (2006.01)
(Continued)

(52) U.S. Cl.
CPC .......... *H04L 9/0866* (2013.01); *H04L 9/3213* (2013.01); *H04L 63/068* (2013.01); *H04L 63/0861* (2013.01); *H04L 67/42* (2013.01)

(58) Field of Classification Search
CPC ... H04L 9/0866; H04L 9/3213; H04L 63/068; H04L 63/0861; H04L 67/42
See application file for complete search history.

(56) References Cited

U.S. PATENT DOCUMENTS

2009/0193508 A1* 7/2009 Brenneman .......... G06Q 20/367 726/9
2016/0277400 A1* 9/2016 Maurya ............... H04L 63/0876
(Continued)

*Primary Examiner* — Kambiz Zand
*Assistant Examiner* — Phuc Pham
(74) *Attorney, Agent, or Firm* — Jacob P. Rohwer; Newport IP, LLC

(57) ABSTRACT

An authentication server may not support all types of user credentials. For example, an on-premise authentication server may support credentials based on user secrets (i.e. username and password) and certificate-based credentials, but not hardware-key based credentials. A client device may use an un-supported type of credential to access resources managed by the on-premise authentication server by authenticating with a web-based authentication server. The web-based authentication server may support any type of credential, and the supported types of credentials may change over time. The web-based authentication server returns an authenticated user token indicating the user has been authenticated, but without authorizing access to any resources. The client device uses the on-premise authentication server to exchange the authenticated user token for an authorized user token. The client device then uses the authorized user token to access resources on the on-premise network.

19 Claims, 9 Drawing Sheets

(51) Int. Cl.
*H04L 9/06* (2006.01)
*H04L 67/01* (2022.01)
*H04L 29/06* (2006.01)

(56) References Cited

U.S. PATENT DOCUMENTS

2016/0294821 A1* 10/2016 Neuman ............. H04L 63/0884
2018/0337914 A1* 11/2018 Mohamad Abdul ...... H04L 9/12
2021/0152538 A1*  5/2021 Kurian ................. H04L 63/068

* cited by examiner

REMOTE AUTHENTICATION FOR ACCESSING ON-PREMISES NETWORK DEVICES

BACKGROUND

Authentication servers validate credentials and authorize access to network resources. For example, an authentication server may validate a user's password before authorizing a client device to access to a file server. Authentication servers may support other types of credentials, including certificates, biometric scans, hardware keys, etc.

However, not all authentication servers support all types of credentials. As such, accessing resources on different networks may require a user to maintain and employ different types of credentials. Maintaining and using different types of credentials is cumbersome and confusing to users, who might not remember which network requires which credential type. Employing different types of credentials is also inefficient, as the client device must expend computing, storage, and network resources to receive and process the different types of credentials.

Furthermore, some authentication servers only support password credentials, which are a security risk and a frequent source of user frustration. Passwords are a security risk because they are easily shared, stolen, or cracked. Passwords are frustrating to users because they change, they expire, and they are easily forgotten. When a password is forgotten, the client device may operate less efficiently, as users may repeatedly guess at their password before successfully logging in.

It is with respect to these and other technical challenges that the disclosure made herein is presented.

SUMMARY

Technologies are disclosed herein for authorizing a client device to access a network resource. The disclosed technologies may be employed when the authentication server that controls access to the network resource does not support the type of credential provided by the client device. Prior to the disclosed technologies, if the authentication server did not support the type of credential provided by the client device, the authentication server was unable to authenticate the user, and so the authentication server was also unable to authorize access to the network resource. For example, an on-premise authentication server that only supports password credentials has been unable to authorize access to a file server if the requesting client provided a hardware-key credential.

In some configurations, the client device authenticates with a second authentication server using the type of credential that was unsupported by the first authentication server. After authenticating the client device, the second authentication server generates an authenticated user token that includes a user identifier and an identifier of the second authentication server. The second authentication server may encrypt the authenticated user token using a secret key that was extracted from the first authentication server.

The second authentication server returns the token to the client device, which in turn provides it to the first authentication server. The first authentication server may determine that the authenticated user token was encrypted using the secret key, and therefore trusts that the user has been properly authenticated. The first authentication server may exchange the authenticated user token for an authorized user token, e.g. a ticket granting ticket, indicating that the client device is authorized to access certain network resources. The client device may then use the authorized user token to access a network resource managed by the first authentication server.

The disclosed techniques address the technical problems described above by allowing a client device to use any type of credential to access to a network resource. The disclosed techniques enable users to move away from insecure password-based credentials and towards the use of more secure hardware and biometric based credentials. In addition to the security benefits, the disclosed techniques streamline login procedures by enabling a single credential to be used for multiple authentication servers.

Additionally, the disclosed techniques reduce utilization of computing resources during a login process, e.g. by avoiding inadvertent or incorrect user input of a password, retry timeouts after too many failed login attempts, password resets, etc. Other technical benefits not specifically mentioned herein can also be realized through implementations of the disclosed subject matter.

It should also be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
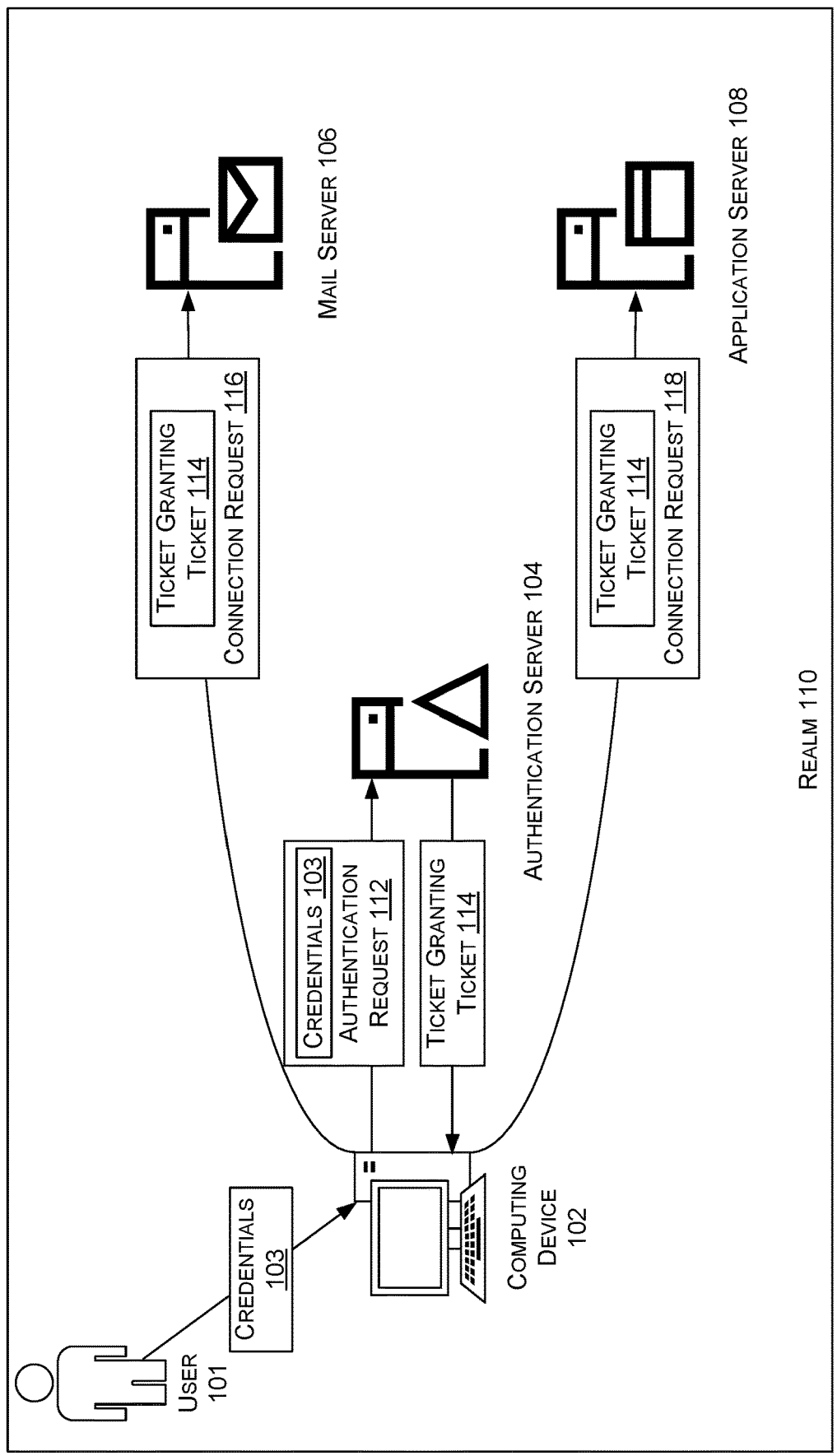
FIG. 1 is a block diagram illustrating an on-premise authentication server authorizing a computing device to access network resources, according to one embodiment.

The following detailed description is directed to technologies for authorizing a computing device to access a network resource controlled by an authentication server when the authentication server does not support the type of credential provided by the computing device. As discussed briefly above, implementations of the disclosed technologies enable the use of alternative types of credentials. Furthermore, implementations of the disclosed technologies enable a user to use a single credential for any authentication server, even if the authentication server does not support the single credential. Consequently, the utilization of computing resources can be reduced by avoiding the processing associated with repeated login attempts, as compared to previous solutions. Other technical benefits not specifically mentioned herein can also be realized through implementations of the disclosed subject matter.

Those skilled in the art will recognize that the subject matter disclosed herein can be implemented with various types of computing systems and modules, at least some of which are described in detail below. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearables, automobiles, home automation etc.), computing or processing systems embedded in devices (such as wearable computing devices, automobiles, home automation etc.), and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for remote authentication for accessing on-premise network devices will be described.

FIG. 1 is a block diagram illustrating an on-premise authentication server 104 authorizing a computing device 102 to access network resources 106 and 108. Authentication server 104 may implement an authentication and authorization protocol such as Kerberos. In some configurations, user 101 submits credentials 103 to computing device 102. Authentication server 104 may support a variety of credential types, including a pre-shared key (i.e. username and password), a hardware-key based credential such as a key supplied by a Fast Identity Online (FIDO) dongle, a key derived from a biometric scan such as a thumbprint, retinal scan, voice recognition, etc.

Computing device 102 may include credentials 103 with authentication request 112. In some configurations, authentication request 112 is sent to authentication server 104. Authentication request 112 may cause authentication server 104 to verify that credentials 103 are associated with user 101. In the case of pre-shared key credentials, which may be a username and password reproduced from a user's memory, authentication server 104 may verify the identity of user 101 by comparing a cryptographic hash of the user's password to a cryptographic hash of the user's password stored in authentication server 104.

If authentication server 104 is able to verify the identity of user 101 based on credentials 103, authentication server 104 may return a ticket granting ticket 114 to computing device 102. Computing device 102 may use ticket granting ticket 114 to receive authorization to access mail server 106 and/or application server 108. In some configurations, computing device 102 presents ticket granting ticket 114 directly to network resources mail server 106 and application server 108. In other embodiments, ticket granting ticket 116 is first presented to a ticket granting server which returns a service ticket usable by computing device 102 to access mail server 106 and application server 108.

In some configurations, authentication server 104 controls access to network resources that are part of realm 110. Network resources that are part of realm 110 may be part of a private network, such as a corporate intranet.

Figure 2:
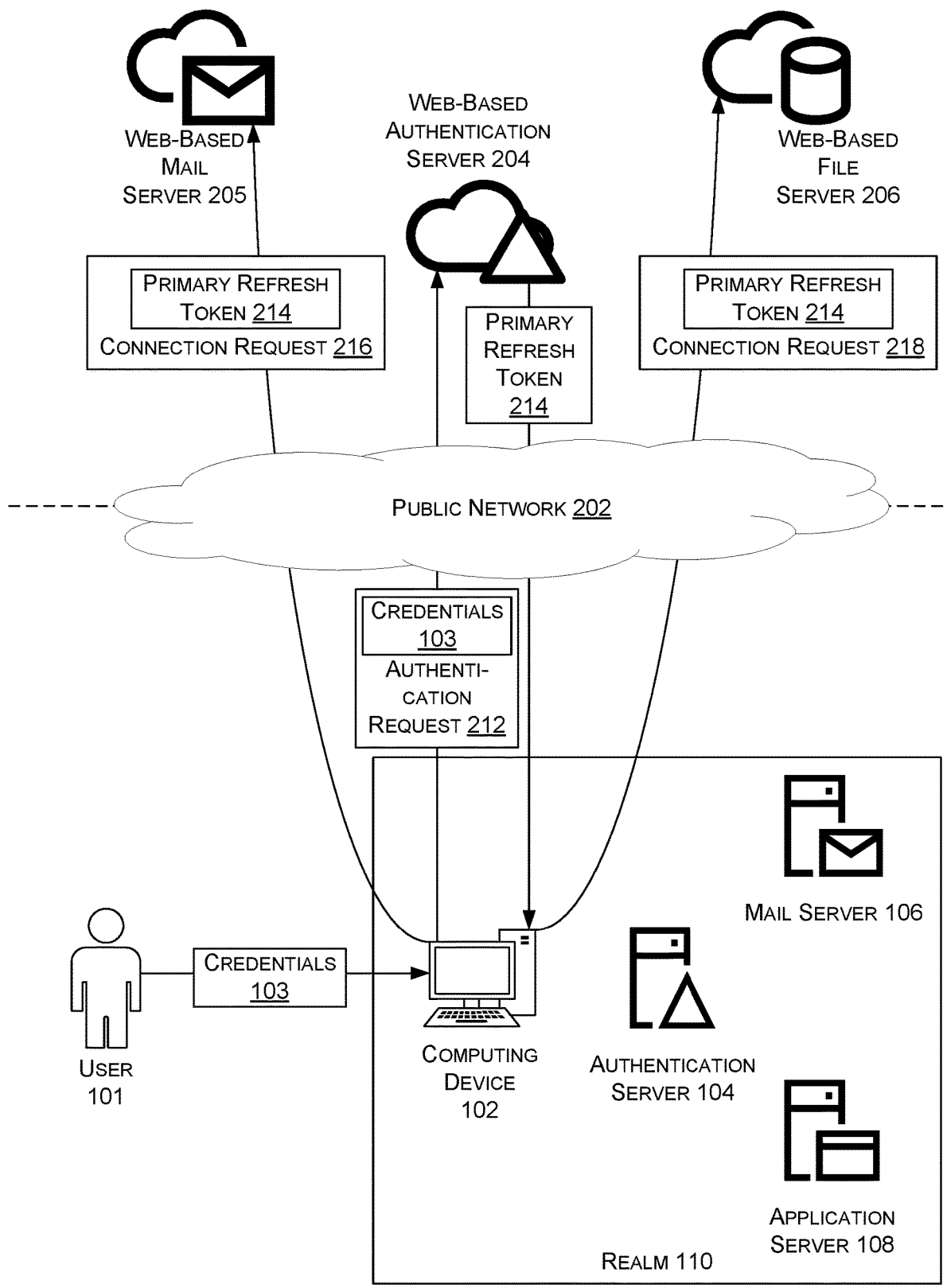
FIG. 2 is a bock diagram illustrating a web-based authentication server authorizing a computing device to access web-based resources, according to one embodiment.

FIG. 2 is a block diagram illustrating a web-based authentication server 204 authorizing computing device 102 to access web-based resources 205 and 206, e.g. web-based mail server 205 and web-based file server 206. Web-based authentication server 204 may be accessed from computing device 102 over public network 202, e.g. the internet. Web-based authentication server 204 is distinguished from on-premise authentication server 104 in that web-based authentication server 204 uses web protocols, such as Open AUTHentication (OAuth), to perform authentication and authorization services. Web-based authentication server 204 may also evolve quickly to support additional types of credentials. In contrast, the typical authentication server 104, which implements Kerberos, may not add support for additional types of credentials.

Throughout this disclosure, on-premise authentication server 104 is used as an example of an authentication server that does not support a particular type of credential, while web-based authentication server 204 is used as an example of an authentication server that supports many types of credentials. The use of these types of authentication servers in this way is for example. It is similarly contemplated that a web-based authentication server does not support a type of credential that an on-premise authentication server does. Also, it is similarly contemplated that there are other types of authentication servers beyond on-premise and web-based.

Furthermore, while web-based authentication server 204 may be used when on-premise authentication server 104 does not support a particular type of credential, web-based authentication server 204 may also be used to authenticate user 101 when on-premise authentication server 104 does support the particular type credential. For example, web-based authentication server 204 may be used when computing device 102 cannot connect to on-premise authentication server 104. For instance, if computing device 102 is connected to the internet in a coffee shop, computing device 102 may not have access to the network on which on-premise authentication server 104 is located. In this case, computing device may utilize web-based authentication server 204 to authenticate user 101.

In some configurations, computing device 102 receives credentials 103 from user 101, e.g. as user 101 types a password into computing device 102. In the case of a hardware-key based credential, credentials 103 may be received from a hardware dongle inserted into computing device 102 by user 101.

In some configurations, computing device 102 may send authentication request 212 to web-based authentication server 204 as part of a login process. In these configurations, computing device 102 may use the result of a successful authentication request, primary refresh token 214, to decide to unlock computing device 102, allowing it to be used by user 101.

Similar to the ticket granting ticket 114 discussed above in conjunction with FIG. 1, primary refresh token 214 may authorize client device 102 to access web-based resources 204 and 206. Accordingly, client device 102 include primary refresh token 214 when submitting connection requests 216 and 218.

Figure 3:
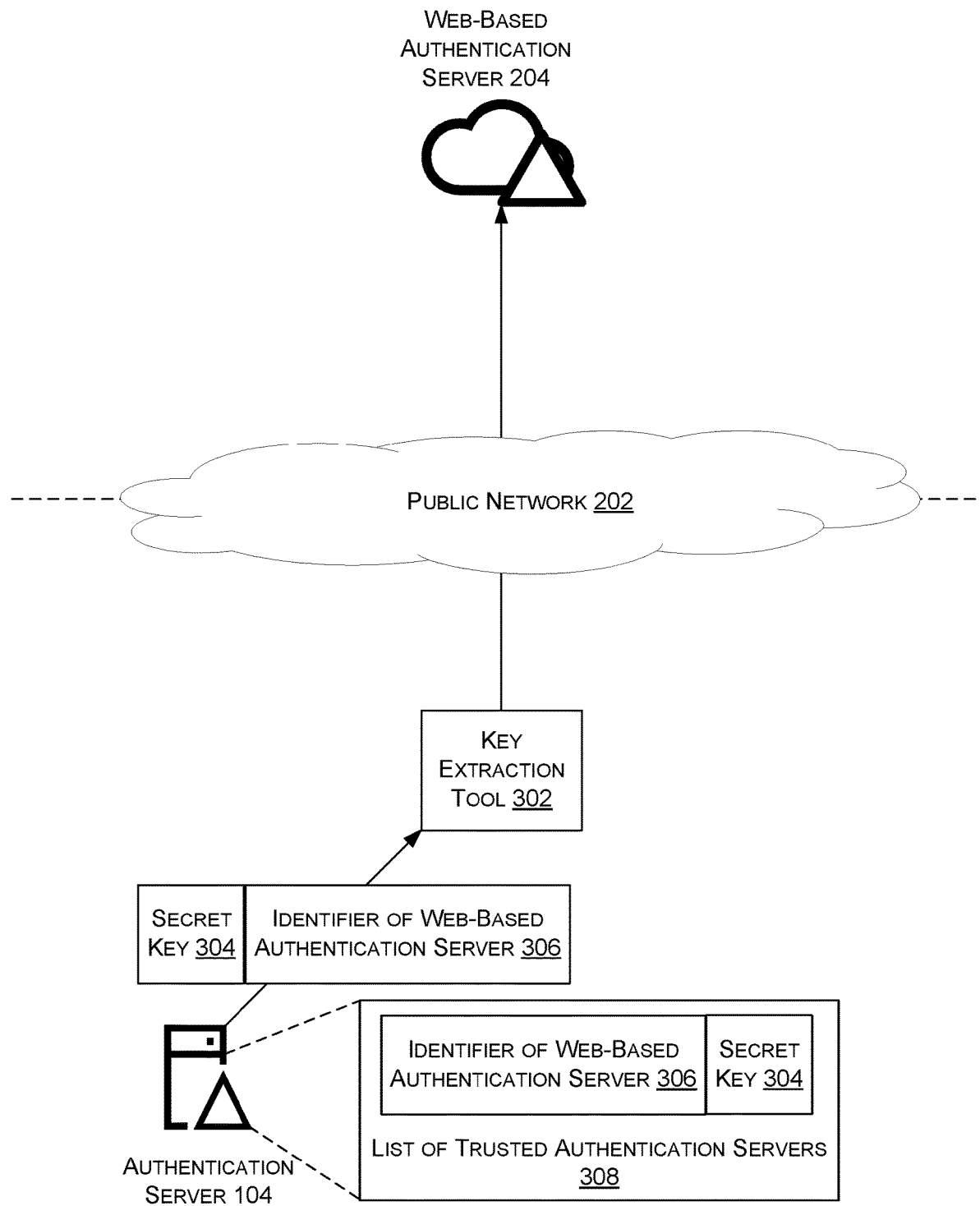
FIG. 3 is a block diagram illustrating a key extraction tool copying a secret key to a web-based authentication server, according to one embodiment.

FIG. 3 is a block diagram illustrating a key extraction tool 302 copying a secret key 304 and an identifier of web-based authentication server 306 to a web-based authentication server 204. Key extraction tool 302 synchronizes the secret key 304 and the identifier 306 between authentication servers 104 and 204 so that web-based authentication server 204 has the information necessary to create a ticket granting ticket' that on-premise authentication server 104 can decrypt. Synchronizing these values also enables on-premise authentication server 104 to verify that any authentication performed by web-based authentication server 204 is legitimate. In some embodiments, key extraction tool 302 in conjunction with authentication server 104 tracks which authentication servers are trusted in a list of trusted authentication servers 308.

Secret key 304 may be any type of cryptographic key usable to encrypt ticket granting ticket', as discussed below in conjunction with FIG. 4A. For example, secret key 304 may be symmetric or asymmetric. Secret key 304 may be specific to on-premise authentication server 104, or a different secret key 304 may be generated for each web-based authentication server that authenticates on behalf of the on-premise authentication server 104.

FIGS. 4A-4D are block diagrams illustrating a computing device 102 using a web-based authentication server 204 in conjunction with an on-premise authentication server 104 to becomes authorized to access network resources 106, 108.

Figure 4A:
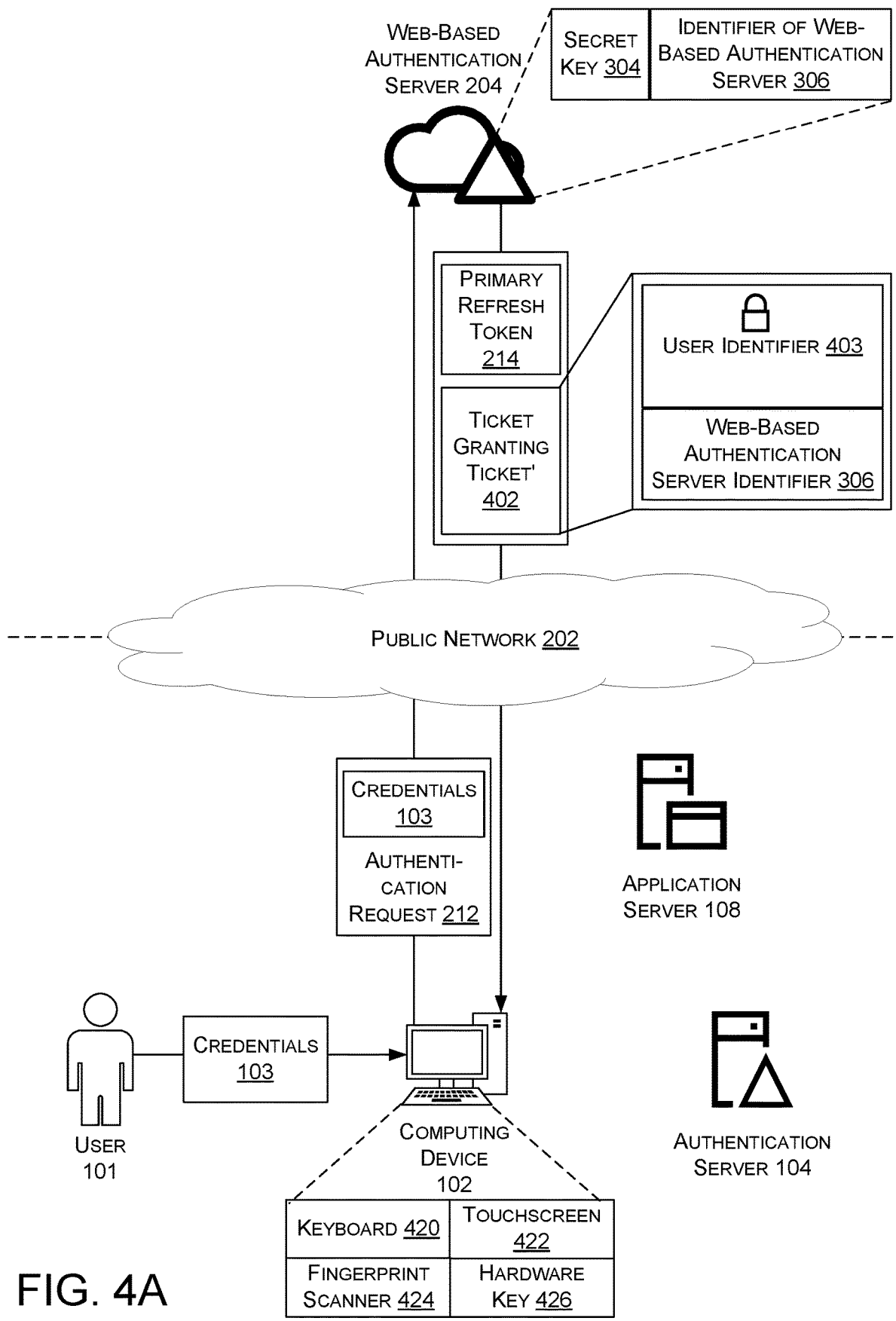
FIG. 4A is a block diagram illustrating a computing device receiving credentials and using a web-based authentication server to authenticate the credentials, according to one embodiment.

FIG. 4A illustrates computing device 102 receiving credentials 103 and using web-based authentication server 204 to authenticate them. Computing device 102 may receive credentials 103 from user 101 as part of a user login workflow, e.g. while logging into computing device 102 itself, using a remote login service such as a domain controller or cloud-hosted login authority such as Windows Hello®, logging into a remote terminal via computing device 102, logging into a network resource, and the like. Computing device 102 may also receive credentials when changing a user's credentials, when unlocking computing device 102, or any other circumstance in which computing device 102 accesses network resources.

In some configurations, computing device 102 may determine that authentication server 104 does not support the type of credential 103 received, and in response, authenticate credentials 103 using web-based authentication server 204 while using authentication server 104 to authorize access to network resources managed by authentication server 104.

Typically, authentication servers authorize access to resources on a particular network, e.g. on-premise authentication server 104 authorizes access to resources on a corporate intranet while web-based authentication server 204 authorizes access to web-based resources, e.g. cloud-based resources. The collection of resources managed by an authentication server may be referred to as a realm, e.g. realm 110 discussed above in conjunction with FIG. 1. Ordinarily, if an authentication server does not support a type of credential, resources managed by that authentication server remain inaccessible. Similarly, if a domain controller does not support a particular type of credential 103, then user 101 may not be able to login to computing device 102 under a domain account using the unsupported credential. As such, in order to access resources on different networks, computing device 102 sends authentication request 212 to an authentication server that does support the type of credential 103 presented by user 101.

As depicted in FIG. 4A, computing device 102 may transmit an authentication request 212 containing credentials 103 over public network 202 to web-based authentication server 204. Web-based authentication server 204 may authenticate credentials 103. Web-based authentication server 204 may use any technique suited to perform the authentication. If the authentication is unsuccessful, an indication that the authentication failed may be returned to computing device 102. In response to an indication of a failed authentication attempt, computing device 102 may try to authenticate credentials 103 on a different authentication server.

However, if the authentication is successful, web-based authentication server 204 may generate an authenticated user token 402, e.g. a ticket granting ticket' 402. The authenticated user token 402 may include a user identifier 403 that is also used by on-premise authentication server 104 to identify user 101. Specifically, on-premise authentication server 104 may authorize user identifier 403 before allowing computing device 102 to access network resources within realm 110. User identifier 403 may be encrypted using secret key 304 assigned by on-premise authentication server 104 to web-based authentication server 204.

Additionally, authenticated user token 402 may include web-based authentication server identifier 306, which is used by on-premise authentication server 104 to identify which authentication server generated authenticated user token 402. Web-based authentication server identifier 306 may be unencrypted. On-premise authentication server 104 may use identifier 306 to verify that authenticated user token 402 was generated by a trusted authentication server.

For example, on-premise authentication server 104 may check that web-based authentication server identifier 306 is one of a list of trusted authentication server identifiers 308. In some embodiments, the list of trusted authentication server identifiers may be generated by key extraction tool 302 as part of the process of copying secret key 304 from authentication server 104 to web-based authentication server 204, as described above in conjunction with FIG. 3. In addition to identifying that authenticated user token 402 was received from a trusted authentication server, on-premise authentication server 104 may use web-based authentication server identifier 306 to retrieve the corresponding secret key 304 used to decrypt user identifier 403.

In addition to determining whether authenticated user token 402 was generated by a trusted authentication server, authentication server 104 may use authentication server identifier 306 and user identifier 403 to determine if the user associated with user identifier 403 is allowed to be authenticated by the authentication server associated with server identifier 306. For example, authentication server 104 may disallow some users from being authenticated by web-based authentication server 204, while allowing the same users to be authenticated by a different server. Which users are allowed to be authenticated by which authentication servers may be defined by a policy configurable by a system administrator of authentication server 104.

In some configurations, web-based authentication server 204 encrypts authenticated user token 402 using secret key 304 provided by on-premise authentication server 104. In this way, on-premise authentication server 104 will be able to decrypt authenticated user token 402, verifying that the contents of authenticated user token 402 has not been modified since it was generated by web-based authentication server 204. Web-based authentication server 204 may then return the authenticated, encrypted user token 402 to computing device 102.

In some configurations, web-based authentication server 204 generates authenticated user token 402 as a secondary action to providing a primary refresh token 214. As discussed above in conjunction with FIG. 2, client device 102 may use web-based authentication server 204 when logging into a remotely hosted account. Examples of a remotely hosted account include a Microsoft® account that manages settings and stores documents across multiple computing devices. In the process of performing this login, computing device 102 may determine that it is also part of realm 110 managed by on-premise authentication server 104, and the on-premise authentication server 104 does not support the type of credential supplied by user 101. In this case, computing device 102 may add a claim to authentication request 212, wherein the claim causes web-based authentication server 204 to return an authenticated user token 402 in addition to primary refresh token 214.

Computing device 102 may receive credentials 103 from a user-input device. For example, credentials based on secret information, i.e. username and password, may be entered using a keyboard 420, touchscreen 422, or any other source of text input. Many authentication servers, often legacy on-premise servers such as Microsoft® Active Directory, may primarily or exclusively support username and password-based credentials 103. Even if updates to these devices are available that would add support for more secure types of credentials, e.g. hardware-based credentials, many network administrators are reluctant to apply these updates. As such, some authentication servers 104 may wait years, if not indefinitely, before support for additional credential types is added.

Other types of credentials include hardware-based credentials, such as a hardware key 426 (e.g. a FIDO dongle) or a biometric based credential such as a key based on fingerprint scanner 424. In some configurations, computing device 102 may include any type of credential in authentication request 212 that authentication server 204 is capable of authenticating.

Figure 4B:
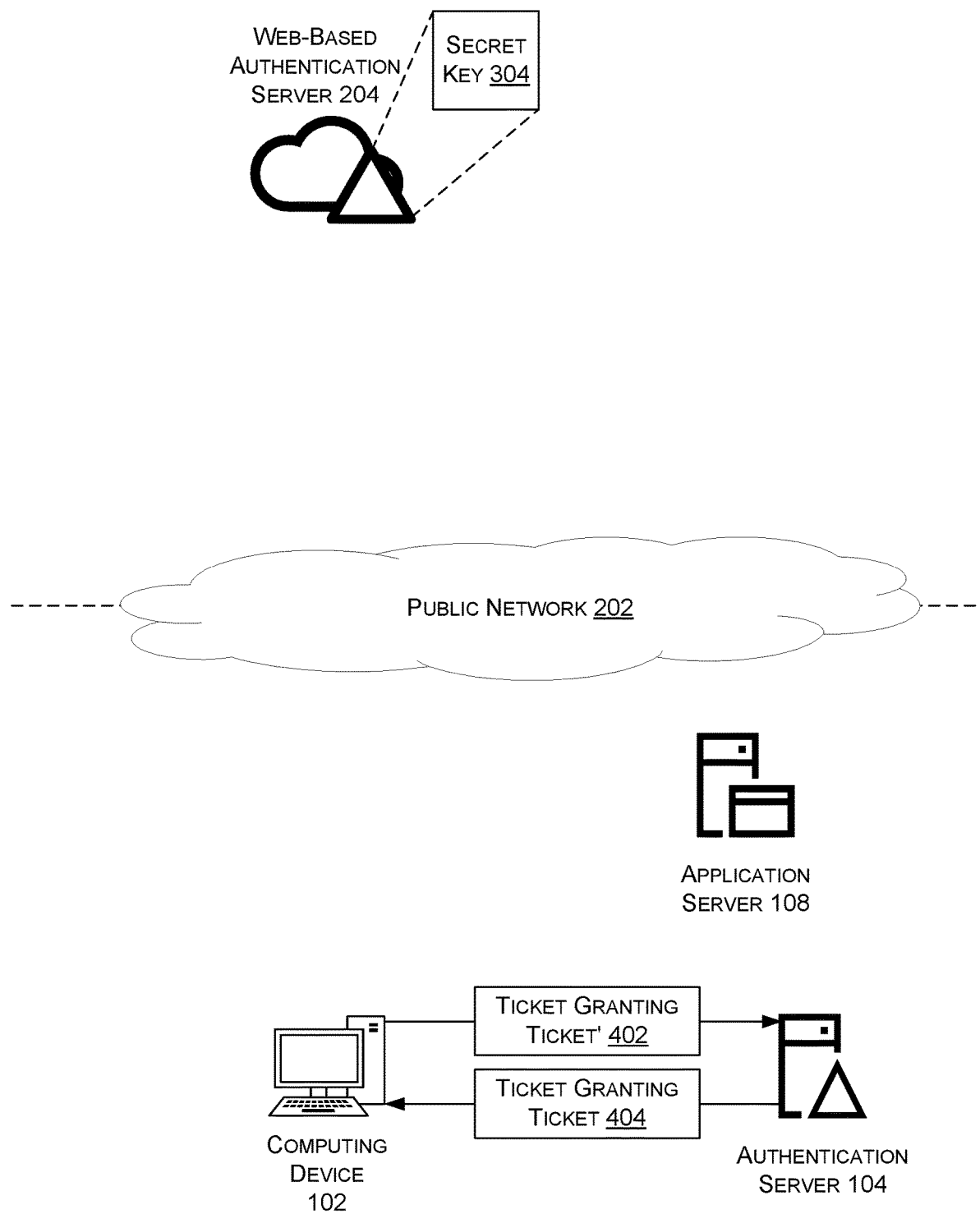
FIG. 4B is a block diagram illustrating a computing device exchanging a ticket granting ticket' for a full ticket granting ticket, according to one embodiment.

FIG. 4B is a block diagram illustrating a computing device 102 exchanging a ticket granting ticket' 402, one type of authenticated user token, for a full ticket granting ticket 404, a type of authorized user token. In some configurations, ticket granting ticket' 402 includes an authenticated identifier associated with user 101, but does not include authorization information, i.e. ticket granting ticket' 402 does not indicate what resources user 101 is authorized to access, what groups user 101 is a member of, etc.

On-premise authentication server 104 may exchange ticket granting ticket' 402 for ticket granting ticket 404 by adding authorization information to the user identifier 403 and other information included in the ticket granting ticket' 402. For example, if user 101 is associated with an identifier "bob03@contoso.com", ticket granting ticket' 402 may indicate that user 101 has been authenticated as "bob03@contoso.com". When exchanging ticket granting ticket' 402 for ticket granting ticket 404, on-premise authentication server 104 may include that user 101 is a member of the accounting department. Later, when computing device 102 uses ticket granting ticket 404 to obtain a service ticket, the computing device will be authorized to access any resources available to members of the accounting department. Similarly, user 101 may be authorized as an individual to access individually authorized resources, such as a personal printer. Other techniques and data structures used to encode authorization information are similarly contemplated.

Figure 4C:
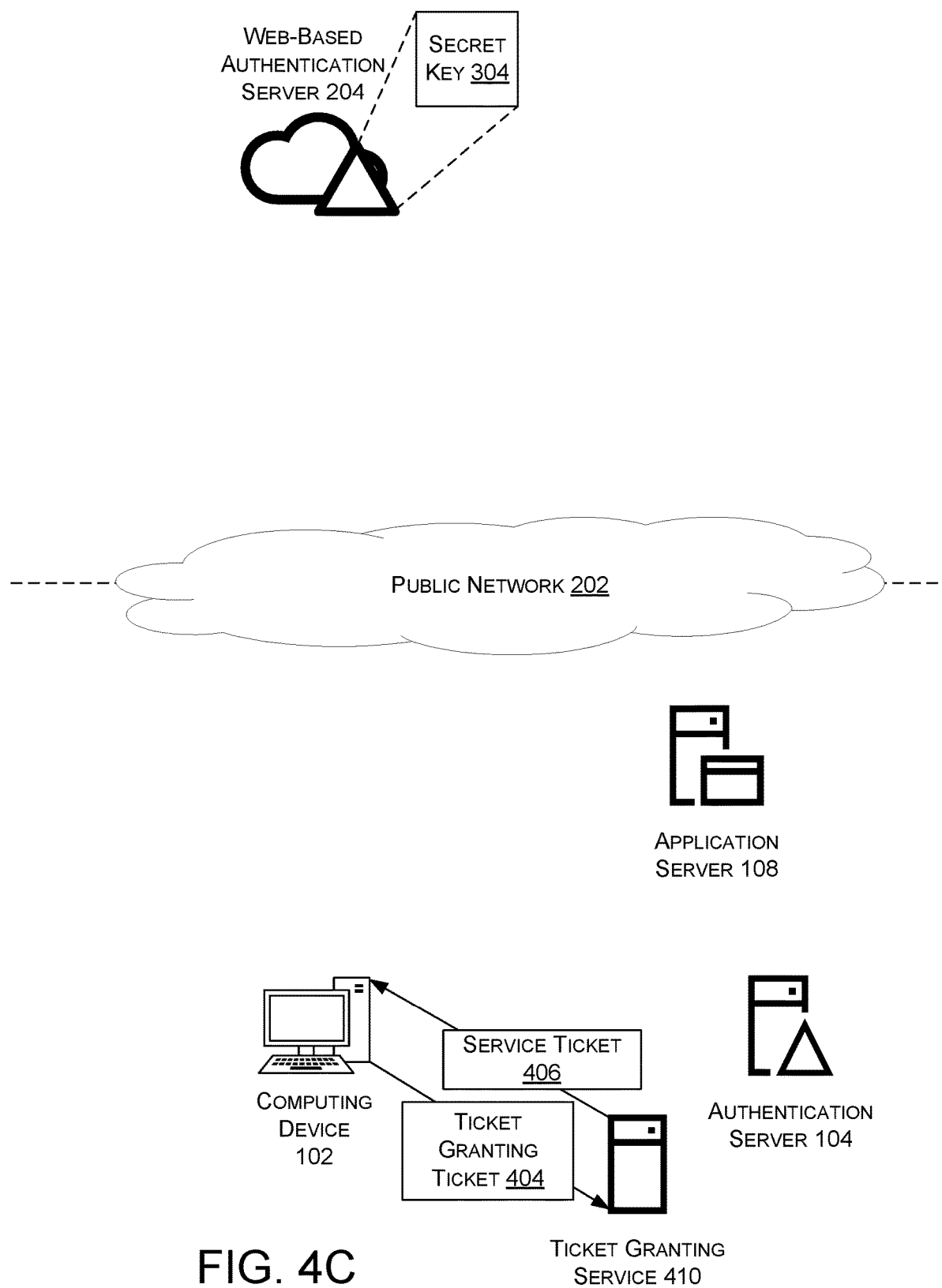
FIG. 4C is a block diagram illustrating a computing device supplying a ticket granting ticket to a ticket granting server, and receiving a service ticket in return, according to one embodiment.

FIG. 4C is a block diagram illustrating computing device 102 supplying a ticket granting ticket 404 to a ticket granting service 410. In response, computing device 102 receives a service ticket 406. In some configurations, ticket granting server 410 is a component of authentication server 104.

Figure 4D:
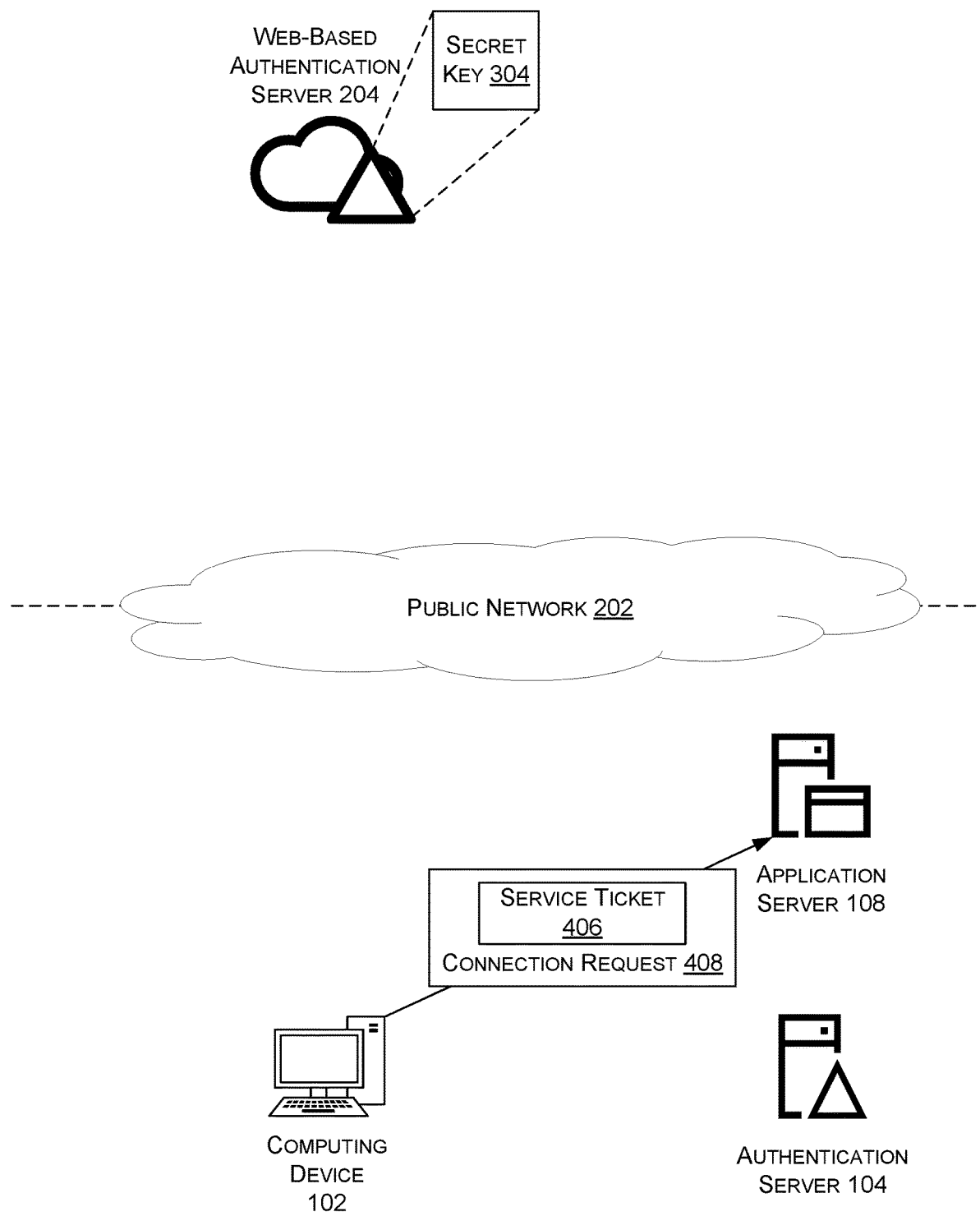
FIG. 4D is a block diagram illustrating a computing device using a service ticket to access an on-premise resource, according to one embodiment.

FIG. 4D is a block diagram illustrating computing device 102 using service ticket 406 to access an on-premise resource 108. In this way, computing device 102 is able to access on-premise resource 108, which is part of realm 110 managed by authentication server 104, without supplying having supplied credentials to authentication server 104.

Figure 5:
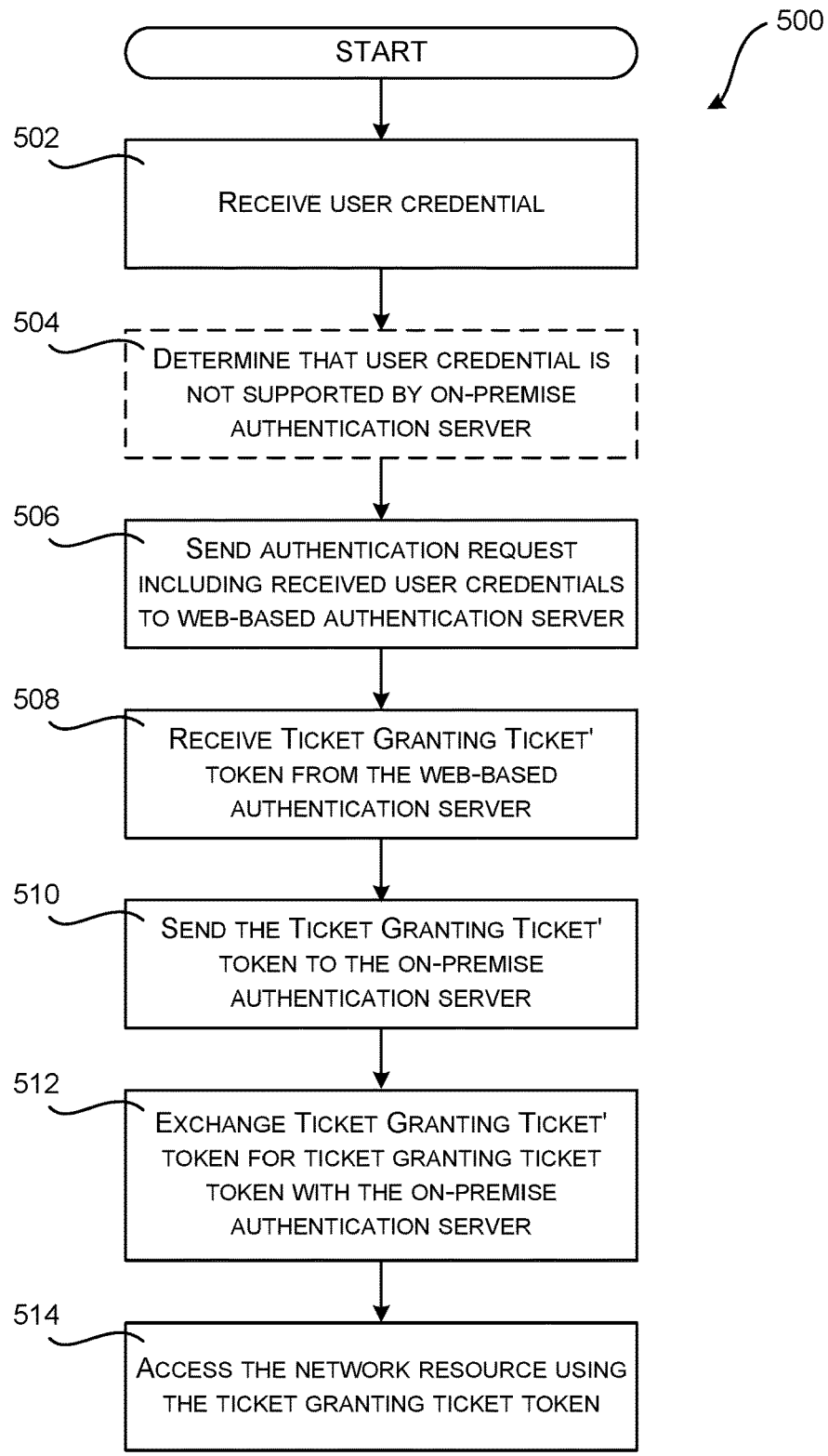
FIG. 5 is a flow diagram showing a routine that illustrates aspects of the operation of a computing device that uses a web-based authentication server in conjunction with an on-premise authentication server gain access to a network resource, according to one embodiment.

FIG. 5 is a flow diagram showing a routine that illustrates aspects of the operation of a computing device that users separate authentication servers to authenticate credentials and authorize access to network resources, according to one embodiment. It should be appreciated that the logical operations described herein with regard to FIG. 5, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 500 begins at operation 502, where the computing device 102 receives a user credential 103. As discussed above, the user credential 103 may be of any type. From operation 502, the routine 500 proceeds to operation 504.

At operation 504, the computing device 102 optionally determines that the type of credential received is incompatible with on-premise authentication server 104. From operation 504, the routine 500 proceeds to operation 506.

At operation 506, the computing device 102 sends authentication request 212 containing credential 103 to web-based authentication server 204, causing web-based authentication server 204 to authenticate credentials 103. From operation 506, the routine 500 proceeds to operation 508, where computing device 102 receives a ticket granting ticket' 402 from web-based authentication server 204 in response to authentication request 212. From operation 508, the routine 500 proceeds to operation 510.

At operation 510, the computing device 102 sends the ticket granting ticket' 402 to on-premise authentication server 104. From operation 510, the routine 500 proceeds to operation 512, where the ticket granting ticket' 402 is exchanged by on-premise authentication server 104 for a full ticket granting ticket 404. From operation 512, the routine 500 proceeds to operation 514, where computing device 500 users ticket granting ticket 404 to access network resources managed by on-premise authentication server 104.

Figure 6:
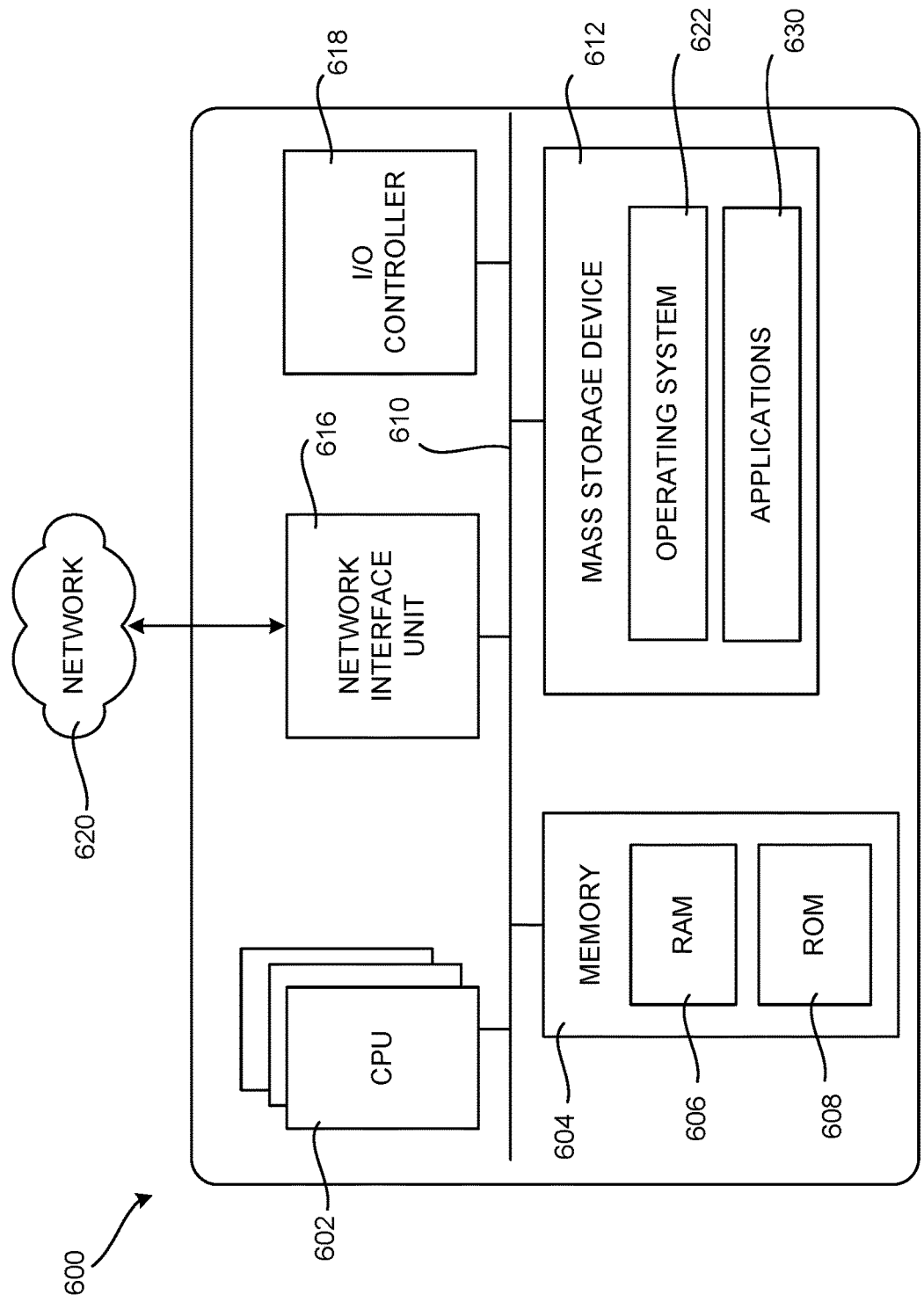
FIG. 6 is a computer architecture diagram showing an illustrative computer hardware and software architecture for a computing device that can implement aspects of the technologies presented herein.

FIG. 6 is a computer architecture diagram showing an illustrative computer hardware and software architecture for a computing device that can implement the various technologies presented herein. In particular, the architecture illustrated in FIG. 6 can be utilized to implement an authentication server, such as the authentication servers 104 and 204 as described herein. The architecture illustrated in FIG. 6 can also be utilized to implement an client device such as client device 102 as described herein. The illustrated architecture can also be utilized to implement other types of computing systems.

The computer 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, can be stored in the ROM 608. The computer 600 further includes a mass storage device 612 for storing an operating system 622, application programs 630, and other types of programs. The functionality described above is implemented by one or more of these programs in various configurations. The mass storage device 612 can also be configured to store other types of programs and data.

The mass storage device 612 is connected to the CPU 602 through a mass storage controller (not shown) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 620. The computer 600 can connect to the network 620 through a network interface unit 616 connected to the bus 610. It should be appreciated that the network interface unit 616 can also be utilized to connect to other types of networks and remote computer systems. The computer 600 can also include an input/output controller 618 for receiving and processing input from a number of other devices, including a keyboard, mouse, touch input, a digital pen, or a physical sensor such as cameras and biometric sensors.

It should be appreciated that the software components described herein, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer-executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 6 for the computer 600, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 600 might not include all of the components shown in FIG. 6, can include other components that are not explicitly shown in FIG. 6, or can utilize an architecture completely different than that shown in FIG. 6.

It should be appreciated that the computing architecture shown in FIG. 6 has been simplified for ease of discussion. It should also be appreciated that the illustrated computing architecture can include and utilize many more computing components, devices, software programs, networking devices, and other components not specifically described herein.

The disclosure presented herein also encompasses the subject matter set forth in the following clauses:

Clause 1. A computer-implemented method for authorizing a computing device 102 to access a network resource 108 controlled by a first authentication server 104, comprising: receiving a user credential 103 at the computing device 102; sending an authentication request 212 including the received user credential 103 to a second authentication server 204; receiving an authenticated user token 402 from the second authentication server 204 in response to the authentication request 212; sending the authenticated user token 402 to the first authentication server 104; receiving an authorized user token 404 derived from the authenticated user token 402 from the first authentication server 104; and using the authorized user token 404 to access the network resource 108.

Clause 2. The computer-implemented method of clause 1, wherein the second authentication server stores a secret key generated by the first authentication server, wherein the second authentication server stores an identifier of the second authorization server generated by the first authentication server, wherein the authenticated user token includes the identifier of the second authentication server, wherein the authenticated user token includes a user identifier associated with the user credential, and wherein the user identifier is encrypted by the second authentication server using the secret key.

Clause 3. The computer-implemented method of clauses 1 and 2, wherein the first authentication server maintains a list of identifiers of trusted authentication servers, and wherein the first authentication server determines that the authenticated user token is valid by verifying that the identifier of the second authentication server is included in the list of identifiers of trusted authentication servers.

Clause 4. The computer-implemented method of clauses 1-3, wherein the authenticated user token comprises a user identifier associated with the user credential, and wherein the first authentication server converts the authenticated user token to an authorized user token by adding one or more resources the identified user is authorized to access to the authenticated user token.

Clause 5. The computer-implemented method of clauses 1-4, wherein the user credential is one of a hardware-key based credential or a biometric based credential.

Clause 6. The computer-implemented method of clauses 1-5, wherein the first authentication server comprises an on-premise authentication server, and wherein the second authentication sever comprises a web-based authentication server.

Clause 7. The computer-implemented method of clauses 1-6 wherein sending the authentication request to the second authentication server causes the second authentication server to validate a user identity.

Clause 8. The computer-implemented method of clauses 1-7, wherein the authenticated user token comprises a ticket granting ticket', and wherein the authorized user token comprises a ticket granting ticket.

Clause 9. A non-transitory computer-readable storage medium 606 having computer-executable instructions stored thereupon which, when executed by a processor 602, cause the processor 602 to: receive, from a first authentication server 104, an identifier 306 of the second authentication server 204; receive, from a client device 102, an authentication request 212 that includes a user credential 103; authenticate the user credential 103; generate an authenticated user token 402 including an identity of the user 403 and the identifier 306 of the second authentication server 204; transmitting the authenticated user token 402 to the client device 102, causing the client device 102 to: exchange, with the first authentication serve 104, the authenticated user token 402 for an authorized user token 404; and use the authorized user token 404 to access a network resource 108 controlled by the first authentication server 104.

Clause 10. The non-transitory computer-readable storage medium of clause 9, wherein the computer-executable instructions further cause the second authentication server to: receive a secret key from a first authentication server; and encrypt the identity of the user with the secret key.

Clause 11. The non-transitory computer-readable storage medium of clauses 9 and 10, wherein the first authorization server determines that the authenticated user token is valid by confirming that the identifier of the second authentication server stored in the authenticated user token is contained in a list of trusted authentication server identifiers.

Clause 12. The non-transitory computer-readable storage medium of clauses 9-11, wherein the first authentication server is unable to authenticate the user credential.

Clause 13. The non-transitory computer-readable storage medium of clauses 9-12, wherein the second authentication server comprises an authentication server accessed over a public network.

Clause 14. The non-transitory computer-readable storage medium of clauses 9-13, wherein the first authentication server comprises an on-premise authentication server that controls access to resources on a private network.

Clause 15. A computing device 102, comprising: one or more processors 602; and at least one non-transitory computer-readable storage medium 606 having computer-executable instructions stored thereupon which, when executed by the one or more processors 602, cause the computing device 102 to: receive a hardware-key or biometric based user credential 103; determine that an on-premise authentication server 104 does not support authenticating the received user credential 103; send an authentication request 212 including the received user credential 103 to a web-based authentication server 204, causing the web-based authentication server 204 to authenticate the received user credential 103; receive a ticket granting ticket' 402 from the web-based authentication server 204, wherein the ticket granting ticket' 402 includes an identity of a user 403 associated with the received user credential 103; exchange, with the on-premise authentication server 104, the ticket granting ticket' 402 for a ticket granting ticket 404; and use the ticket granting ticket 404 to access a network resource 108 controlled by the on-premise authentication server 104

Clause 16. The computing device of clause 15, wherein the computer-executable instructions further cause the computing device to: receive a primary refresh token from the web-based authentication server; and use the primary refresh token to unlock the computing device.

Clause 17. The computing device of clauses 15 and 16, wherein the on-premise authentication server includes an authorization server that exchanges the ticket granting ticket' with a ticket granting ticket by adding authorization information to the content of the ticket granting ticket'.

Clause 18. The computing device of clauses 15-17, wherein the web-based authentication server stores a secret key generated by the on-premise authentication server and an identifier of the web-based authentication server that was generated by the on-premise authentication server.

Clause 19. The computing device of clauses 15-18, wherein the web-based authentication server includes the identifier of the web-based authentication server that was generated by the on-premise authentication server in the ticket granting ticket'.

Clause 20. The computing device of clauses 15-19, wherein a tool in communication with the on-premise authentication server caused the on-premise authentication server to generate the secret key and the identifier of the web-based authentication server, and wherein the tool extracted the secret key and the identifier of the web-based authentication server and provided the secret key and the identifier to the web-based authentication server.

Based on the foregoing, it should be appreciated that technologies for providing transitions and optimizations for a foldable computing device operating in a productivity mode have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for authorizing a computing device to access a network resource controlled by a first authentication server, comprising:
   receiving a user credential at the computing device;
   determining that the first authentication server does not support authenticating the user credential based on a type of the user credential;
   in response to determining that the first authentication server does not support authenticating the user credential based on the type of the user credential, sending an authentication request including the user credential to a second authentication server that supports authenticating the type of the user credential;
   receiving an authenticated user token from the second authentication server in response to sending the authentication request;
   sending the authenticated user token to the first authentication server;
   receiving an authorized user token derived from the authenticated user token from the first authentication server; and
   using the authorized user token to access the network resource.

2. The computer-implemented method of claim 1, wherein the second authentication server stores a secret key generated by the first authentication server, wherein the second authentication server stores an identifier of the second authentication server generated by the first authentication server, wherein the authenticated user token includes the identifier of the second authentication server, wherein the authenticated user token includes a user identifier associated with the user credential, and wherein the user identifier is encrypted by the second authentication server using the secret key.

3. The computer-implemented method of claim 2, wherein the first authentication server maintains a list of identifiers of trusted authentication servers, and wherein the first authentication server determines that the authenticated user token is valid by verifying that the identifier of the second authentication server is included in the list of identifiers of trusted authentication servers.

4. The computer-implemented method of claim 1, wherein the authenticated user token comprises a user identifier associated with the user credential, and wherein the first authentication server converts the authenticated user token to an authorized user token by adding one or more resources the identified user is authorized to access to the authenticated user token.

5. The computer-implemented method of claim 1, wherein the user credential is one of a hardware-key based credential or a biometric based credential.

6. The computer-implemented method of claim 1, wherein the first authentication server comprises an on-premise authentication server, and wherein the second authentication sever comprises a web-based authentication server.

7. The computer-implemented method of claim 1, wherein sending the authentication request to the second authentication server causes the second authentication server to validate a user identity.

8. The computer-implemented method of claim 1, wherein the authenticated user token comprises a ticket granting ticket, and wherein the authorized user token comprises a ticket granting ticket.

9. A non-transitory computer-readable storage medium having computer-executable instructions stored thereupon which, when executed by a processor, cause the processor to:
   receive, from a first authentication server, an identifier of a second authentication server;
   receive, from a client device and based on a determination that the first authentication server does not support authenticating a user credential based on a type of the user credential, an authentication request that includes the user credential;
   authenticate the user credential based on the type of the user credential;
   generate an authenticated user token including an identity of a user and the identifier of the second authentication server;
   transmit the authenticated user token to the client device, causing the client device to:
      exchange, with the first authentication server, the authenticated user token for an authorized user token; and
      use the authorized user token to access a network resource controlled by the first authentication server.

10. The non-transitory computer-readable storage medium of claim 9, wherein the computer-executable instructions further cause the processor to:
receive a secret key from the first authentication server; and
encrypt the identity of the user with the secret key.

11. The non-transitory computer-readable storage medium of claim 10, wherein the first authentication server determines that the authenticated user token is valid by confirming that the identifier of the second authentication server stored in the authenticated user token is contained in a list of trusted authentication server identifiers.

12. The non-transitory computer-readable storage medium of claim 9, wherein the second authentication server comprises an authentication server accessed over a public network.

13. The non-transitory computer-readable storage medium of claim 12, wherein the first authentication server comprises an on-premise authentication server that controls access to resources on a private network.

14. A computing device, comprising:
one or more processors; and
at least one non-transitory computer-readable storage medium having computer-executable instructions stored thereupon which, when executed by the one or more processors, cause the computing device to:
receive a hardware-key or biometric based user credential;
determine that an on-premise authentication server does not support authenticating the hardware-key or biometric based user credential;
send an authentication request including the hardware-key or biometric based user credential to a web-based authentication server;
in response to the web-based authentication server authenticating the hardware-key or biometric based user credential, receive a first ticket granting ticket from the web-based authentication server, wherein the first ticket granting ticket includes an identity of a user associated with the hardware-key or biometric based user credential;
exchange, with the on-premise authentication server, the first ticket granting ticket for a second ticket granting ticket; and
use the second ticket granting ticket to access a network resource controlled by the on-premise authentication server.

15. The computing device of claim 14, wherein the computer-executable instructions further cause the computing device to:
receive a primary refresh token from the web-based authentication server; and
use the primary refresh token to unlock the computing device.

16. The computing device of claim 14, wherein the on-premise authentication server includes an authorization server that exchanges the first ticket granting ticket for the second ticket granting ticket by adding authorization information to the content of the first ticket granting ticket.

17. The computing device of claim 16, wherein the web-based authentication server stores a secret key generated by the on-premise authentication server and an identifier of the web-based authentication server that was generated by the on-premise authentication server.

18. The computing device of claim 17, wherein the web-based authentication server includes the identifier of the web-based authentication server that was generated by the on-premise authentication server in the first ticket granting ticket.

19. The computing device of claim 17, wherein a tool in communication with the on-premise authentication server caused the on-premise authentication server to generate the secret key and the identifier of the web-based authentication server, and wherein the tool extracted the secret key and the identifier of the web-based authentication server and provided the secret key and the identifier to the web-based authentication server.

* * * * *